US007849737B2

(12) United States Patent  (10) Patent No.: US 7,849,737 B2
Ooishi  (45) Date of Patent: Dec. 14, 2010

(54) GAS METER

(75) Inventor: Yasuharu Ooishi, Tokyo (JP)

(73) Assignee: Yamatake Corporation, Tokyo (JP)

( * ) Notice: Subject to any disclaimer, the term of this patent is extended or adjusted under 35 U.S.C. 154(b) by 171 days.

(21) Appl. No.: 12/357,509

(22) Filed: Jan. 22, 2009

(65) Prior Publication Data

US 2009/0188303 A1   Jul. 30, 2009

(30) Foreign Application Priority Data

Jan. 24, 2008   (JP)   ............... 2008-013635

(51) Int. Cl.
*G01F 7/00*   (2006.01)
(52) U.S. Cl. ...................................... 73/196
(58) Field of Classification Search ................ None
See application file for complete search history.

(56) References Cited

U.S. PATENT DOCUMENTS

| | | | |
|---|---|---|---|
| 3,559,482 A * | 2/1971 | Baker et al. | ............... 73/202.5 |
| 4,653,321 A | 3/1987 | Cunningham et al. | |
| 5,804,717 A * | 9/1998 | Lucas | ............... 73/202 |
| 6,401,531 B1 * | 6/2002 | Tank et al. | ............... 73/204.21 |
| 6,446,503 B1 | 9/2002 | Nukui et al. | |
| 7,614,295 B2 * | 11/2009 | Niikawa et al. | ............... 73/202.5 |
| 2006/0283013 A1 | 12/2006 | Parris et al. | |
| 2009/0007654 A1 * | 1/2009 | Niikawa et al. | ............... 73/202 |
| 2009/0025472 A1 * | 1/2009 | Garvin | ............... 73/202 |

FOREIGN PATENT DOCUMENTS

| | | |
|---|---|---|
| CN | 101082514 A | 12/2007 |
| DE | 19615857 | 10/1997 |
| JP | 04-069521 A | 3/1992 |
| JP | 11-173896 A | 7/1999 |

OTHER PUBLICATIONS

Extended Search Report mailed Aug. 10, 2009 during the prosecution of corresponding European Application No. 09250180.8.

* cited by examiner

*Primary Examiner*—Harshad Patel
(74) *Attorney, Agent, or Firm*—McDermott Will & Emery LLP

(57) ABSTRACT

A gas meter with a simple structure for detecting a range from a minute flow rate, such as a gas leak, to the large flow rate of the normal state of use of the gas, while protecting the flow rate sensor from dust and without producing the problem of pressure loss. First, second, and third flow paths for carrying partial flows of a gas to be measured, in accordance with the flow rate, are provided by partitioning, in parallel, the cross-sectional surface of a main flow path. A flow rate sensor for flow rate measurement is provided in the first flow path with a small flow path cross-sectional area, and a flow rate sensor for detecting a gas leak is provided in the second flow path with a small flow path cross-sectional area, where a flow baffling filter is provided on one end side or both ends of the first and second flow paths, and a contaminant (dust) removing filter is provided on one end side or both ends of the first flow path.

5 Claims, 6 Drawing Sheets

GAS METER

CROSS-REFERENCE TO RELATED APPLICATION

This application claims priority from Japanese Patent Application No. 2008-13635, filed Jan. 24, 2008, which is incorporated by reference herein in its entirety

FIELD OF THE INVENTION

The present invention relates to a gas meter with a simple structure capable of measuring with high accuracy and good reliability the flow rate of a gas to be measured, while protecting the flow rate sensor from dust.

BACKGROUND OF THE INVENTION

A gas meter that uses a thermal flow sensor has been proposed wherein the speed of flow is increased at the position of a wall surface by partitioning, into a plurality of parallel minute flow paths, in the direction of flow of a fluid, the internal portion of a flow path wherein the a flow rate sensor has been attached to the wall surface, and a nozzle portion is provided in the middle of the flow path, to thereby increase the speed of flow at the nozzle portion, to thereby increase the detection sensitivity and to detect minute flow rates. Such a gas meter has been described, for example in Japanese Unexamined Patent Application Publication H4-69521 and Japanese Unexamined Patent Application Publication H11-173896, each of which is incorporated by reference in its entirety herein.

However, when the detection sensitivity is increased for a minute flow, through the means described above, the detection sensitivity is also increased for a large flow rate commensurately, saturating the output of the flow rate sensor when there is a large flow rate, and thus there is a problem in that the measurement is not possible when there is a large flow rate. For this reason, it is difficult to detect accurately down to a minute leakage flow rate of about 5 liters per hour (l/h) in a gas meter for, for example, a maximum measurable flow rate of 30,000 l/h.

On the other hand, in order to increase the detection accuracy it is important to prevent the adhesion, to the flow rate sensor, of contaminants (dust) that are mixed into the gas to be measured. Given this, various attempts have been made in the past to interpose dust-removing filters into the flow path of the gas to be measured. However, in low-pressure gas meters wherein the supply pressure of the gas to be measured is about 2 Kilopascals (kPa), the allowable pressure loss is about 200 Pascals (Pa) at the most, and thus there are problems in providing a dust-removing filter wherein there is a large pressure loss. In particular, in a so-called small-mesh dust-removing filter wherein the dust capture ratio is high, the pressure loss is large, and thus it is still difficult to incorporate these into a low-pressure gas meter as described above.

SUMMARY OF THE INVENTION

The present invention was created in contemplation of this type of situation, and the object thereof is to provide a gas meter with a simple structure that is able to detect, with good accuracy and good reliability, a range from minute flow rates, such as, for example, gas leaks, through large flow rates in the normal state of use of gas, doing so easily, while protecting the gas magnitude sensor from contaminants (dust) that are mixed into the gas to be measured.

Specifically, the object of the present invention is to provide a gas meter that is structured so as to be able to measure from, for example, minute leakage flow rates of about 5 l/h, through large flow rates of about 30,000 l/h, and, in particular, to provide a gas meter with a simple structure able to improve the reliability of the flow rate measurement and the measurement accuracy thereof, while reliably protecting the flow rate sensor from dust.

A gas meter as set forth in the present invention, in order to achieve the object set forth above, may be characterized by the provision of:

<1> a first flow path, a second flow path, and a third flow path provided in parallel by partitioning, along the direction of the flow path, the flow path cross section of a main flow path through which the gas to be measured flows, wherein the part flows of the gas to be measured depends on the gas flow rate;

<2> a flow rate sensor for measuring the flow rate, provided in the first flow path and a flow rate sensor for measuring a leakage flow rate provided in the second flow path;

<3> a filter for flow baffling, provided in either one end or both ends of the first and second flow paths; and <4> a contaminant-removing filter, for preventing the incursion of contaminants into the first flow path by capturing contaminants that are mixed into the gas to be measured, provided at one end or both ends of the first flow path.

Note that the third flow path may be made from a collection of a plurality of minute flow paths that are provided in parallel, having a smaller flow path cross-sectional area than that of the first and second flow paths, where the part flow rate is larger than that of the first and second flow paths, carrying most of the gas to be measured that passes through the main flow path.

In this case, the first and second flow paths, which have a minute flow path cross-sectional area when compared to the third flow path, have a high part flow ratio in the interval with the third flow path when the flow rate of the gas to be measured, which is flowing through the main flow path, is low, but structured so that when the flow rate of the gas to be measured, which is flowing to the main flow path, is high, the part flow ratio in respect to the third flow path, is decreased.

Additionally, the second flow path may be provided with a narrow width portion wherein the cross-sectional area of the flow path is constricted after securing a supplemental interval relative to the flow of the gas to be measured, in a flow path structure wherein the flow rate sensor is built into this narrow width portion. That is, the second flow path is structured so as to be able to detect the flow rate reliably, even if there is a minute flow of the gas to be measured, through increasing the speed of flow by directing the gas to be measured, which flows in the aforementioned supplemental interval, to this narrow width portion. Preferably, the second flow path, provided for gas leak measurement, is not provided with a contaminant-removing filter, or in other words, the contaminant-removing filter should be provided only in the aforementioned first flow path that is provided for the flow rate measurement.

Note that in the first and second flow paths, and for the plurality of minute flow paths that form the third flow path, the flow path cross section of the main flow path may be partitioned by a plurality of partitioning walls that are provided along the direction of flow of the main flow path, for example.

In the gas meter of the basic structure set forth above, a contaminant-removing filter is preferably provided in only the first flow path that is provided for the flow rate measurement, so there is no change, due to the adhesion of contaminants, to the detection characteristics of the flow rate sensor that is provided in the first flow path. Furthermore, the first and second flow paths, wherein the flow rates sensors are provided, have a larger flow of the gas to be measured in the minute flow rate because the partial flow in respect to the third flow path is higher when the flow rate of the gas to be measured, which is flowing through the main flow path, is small, and when the flow rate of the gas to be measured, which is flowing through the main flow path, is large, then the partial flow rate in respective the third flow path is lower, preventing the passage of a large flow rate of the gas to be measured. Consequently, the provision of the respective flow rates sensors of the first and second flow paths, that act in this way, enables easy measurement, with good accuracy, over a broad range from minute flow rates, such as gas leaks, to the large flow rates of the normal state of use of the gas.

Furthermore, the flow path cross-sectional areas of the first flow path, which is provided for the flow rate measurement, and the second flow path, which is provided for detecting the leakage flow rate, are adequately narrow when compared with the flow path cross-sectional area of the third flow path, resulting in nearly all of the gas to be measured passing through the third flow path that has the large partial flow rate, making it possible to incorporate a contaminant-removing filter in the first flow path without the risk of problems with pressure loss. Consequently, measurements of the flow rates of the gas to be measured can be performed with good accuracy in a state that is always clean.

Note that in the second flow path, it is adequate to be able to detect only whether or not a leakage flow rate exists, and there is no need to increase the measurement accuracy by providing the contaminant-removing filter described above. Consequently, there is no difficulty with the pressure loss due to the existence of the contaminant-removing filter that is provided in the first flow path, or the minute flow rate of the gas to be measured, resulting from a gas leak, being impeded thereby and thus flowing into the second flow path. The result is that it is possible to detect with good reliability and high accuracy the flow rate of the gas to be measured in the first flow path, while possible to detect reliably a gas leak with a minute flow rate in the second flow path.

Given the structure set forth above, the flow rates sensors that are built into the first and second flow paths do not become saturated, due to the existence of the third flow path, enabling integrated detection over a broad range, from a minute flow rate to a large flow rate.

Note that after securing a supplemental interval relative to the flow of the gas to be measured, a narrow width portion, wherein the flow path cross-sectional area is constricted, is preferably provided in the second flow path, and by building the flow rate sensor into this narrow width portion it is possible to increase the flow velocity of the minute flow rate that flows in the second flow path at the narrow width portion. The result is that it is possible to essentially increase the sensitivity of detection of the flow rate sensor, making it possible to detect minute flow rates easily. In particular, because the narrow width portion also functions to add resistance to the flow path for a large flow rate, it functions with the effect of passively changing the partial flow ratio in relation to the third flow path.

BRIEF DESCRIPTION OF THE DRAWINGS

The present inventions will become more readily apparent from the Detailed Description of the Invention, which proceeds with reference to the drawings, in which.

DETAILED DESCRIPTION OF THE INVENTION

A gas meter as set forth in the present invention will be described below in reference to the drawings.

A gas meter structured in accordance with the present invention uses a thermal flow sensor for detecting the mass flow rate of, for example, the gas to be measured. Although not illustrated explicitly, this thermal flow sensor may be preferably structured through the provision of a pair of temperature-sensitive resistive elements in the direction of flow of a fluid between heat-generating resistive elements in a thin-walled diaphragm that is formed on a silicon substrate or glass substrate, so as to be able to detect the flow rate (flow velocity) of the fluid from changes in the temperature distribution in the vicinity of the sensor surface due to the fluid that flows along the sensor surface.

Figure 1:
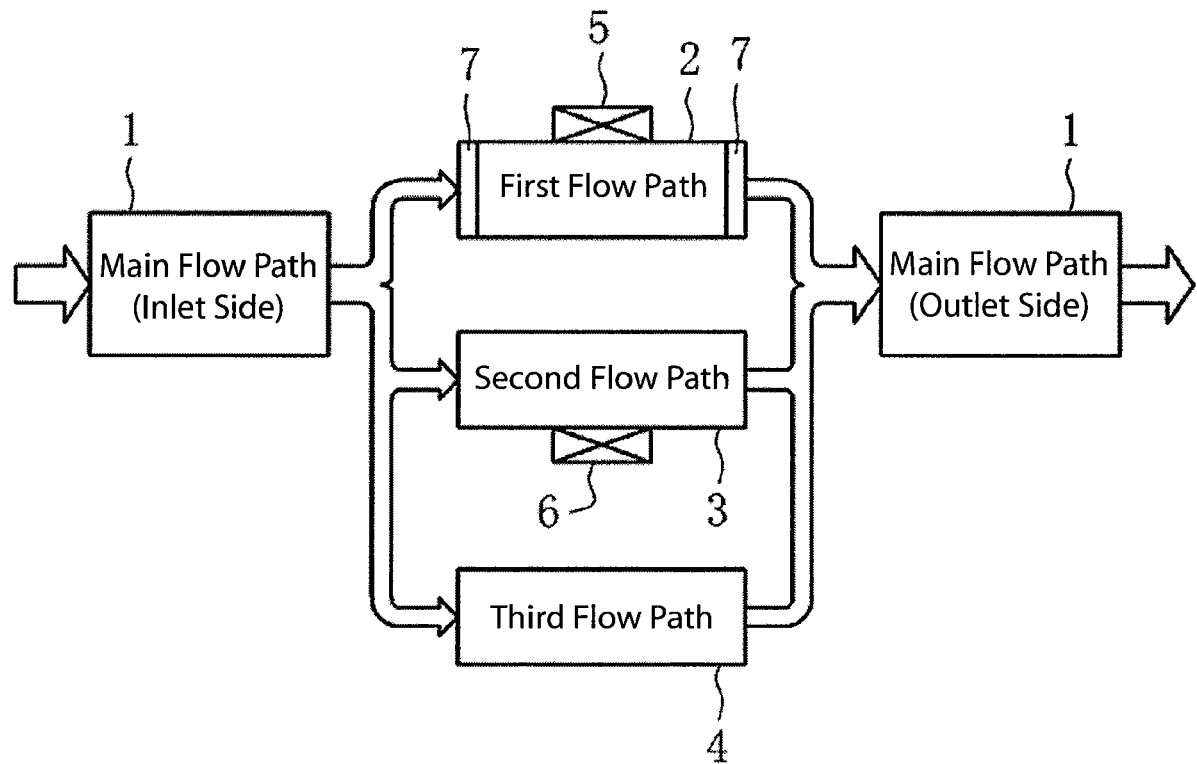
FIG. 1 illustrates schematically a basic structure of a gas meter according to the present invention.

FIG. 1 is a schematic diagram that explains the basic structure of a gas meter according to the present invention. This gas meter, as illustrated in FIG. 1, is structured through the provision, in a main flow path 1 through which the gas to be measured flows, of first, second, and third flow paths 2, 3, and 4, through which there are partial flows of a gas to be measured. In particular, the third flow path 4 should carry nearly all of the gas to be measured that flows through the first flow path 1, and is structured so as to have a large flow path cross-sectional area when compared to those of the first and second flow paths 2 and 3. Specifically, the first and second flow paths 2 and 3 are each preferably formed as flow paths having flow path cross-sectional areas of approximately 5% of that of the main flow path 1, where, in contrast, the third flow path 4 is structured as a flow path preferably having a flow path cross-sectional area that is approximately 90% of that of the main flow path 1.

Note that the third flow path 4 may preferably be achieved as a collection of a plurality of minute flow paths each having cross-sectional areas that are narrower than, for example, about half that of, each of the flow path cross-sectional areas of the first and second flow paths 2 and 3, as described below. As a result, the flow path resistance R3, relative to the gas to be measured, of the third flow path 4, for a minute flow rate, is higher than either of the flow path resistances R1 and R2 of the first and second flow paths 2 and 3, where, as the flow rate becomes larger, the difference between the flow path resistances R1 and R2 of the first and second flow paths 2 and 3 and the flow path resistance R3 of the third flow path 4 becomes smaller.

Figure 2:
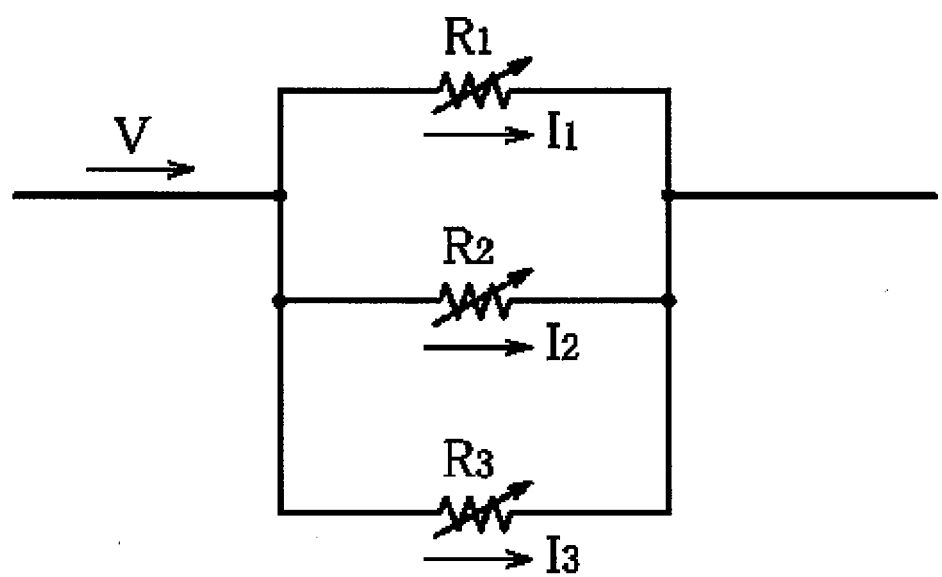
FIG. 2 illustrates an equivalent flow path structure of the gas meter illustrated in FIG. 1.
Figure 3:
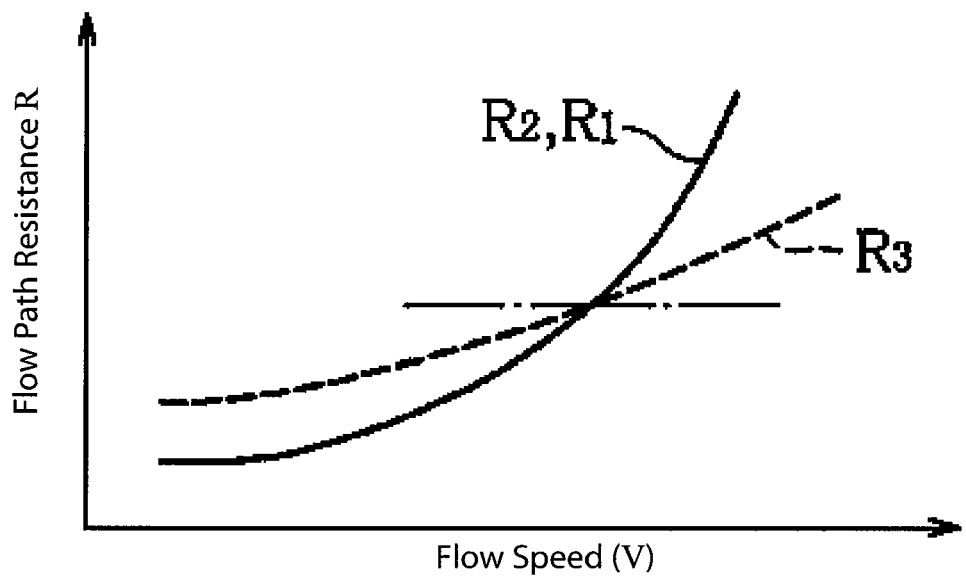
FIG. 3 illustrates a varying characteristic of flow path resistance as a function of flow rates in the first and second flow paths for the gas meter illustrated in FIG. 1.
Figure 4:
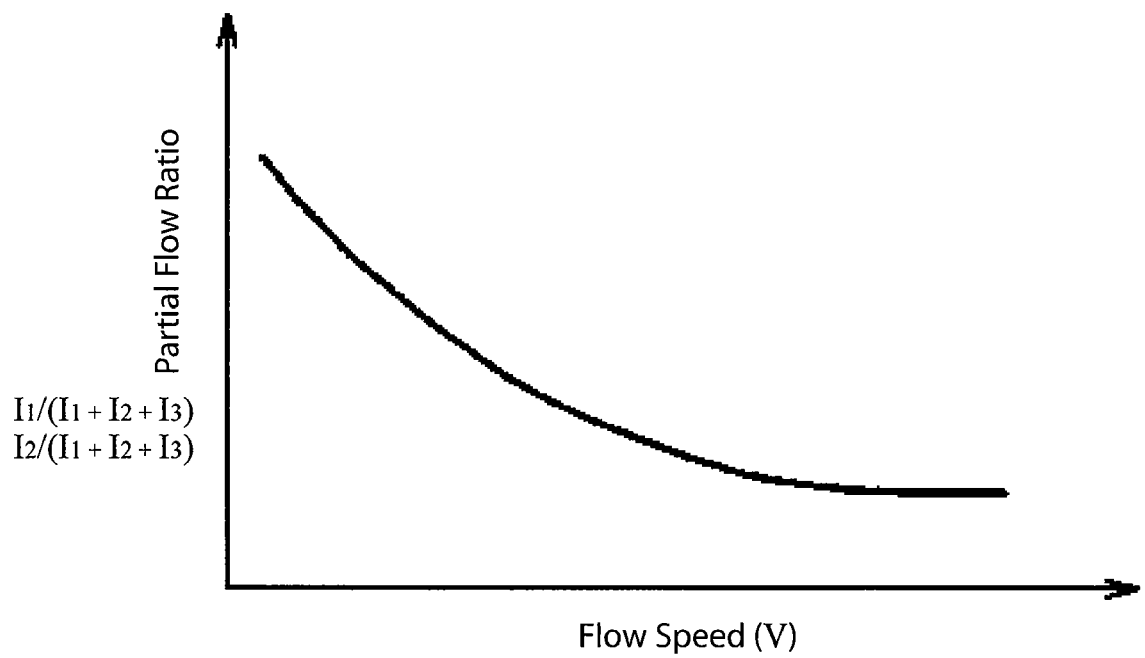
FIG. 4 illustrates a change in the partial flow rates between the first and second flow paths as a function of flow rates in the first and second flow paths for the gas meter illustrated in FIG. 1.

That is, the first and second flow paths 2 and 3, and the third flow path 4 have flow path resistances R1, R2, and R3 that vary passively in response to the flow rate (flow velocity) V of the gas to be measured that flows in the main flow path 1, and as a result, the partial flow rates between each of the flow paths 2, 3, and 4 will vary accordingly for the gas to be measured. These first, second, and third flow paths 2, 3, and 4 are resistance circuits such as illustrated equivalently in FIG. 2. Furthermore, the respective flow path resistances R1, R2, and R3 of the first, second, and third flow paths 2, 3, and 4 vary passively such as, for example, as illustrated in FIG. 3, depending on the flow rate (flow velocity) V of the gas to be measured that flows in the main flow path 1. As a result, the first, second, and third flow paths 2, 3, and 4 will each carry respective partial flows at flow rates I1, I2, and I3 of the gas to be measured in accordance with the respective flow resistances R1, R2, and R3, and with a flow path structure wherein the part flow ratios [I1/(I1+I.2+I3)] and [I2/(I1+I2+I3)] will vary as illustrated in FIG. 4 depending on the flow rate (flow velocity) V of the fluid.

Furthermore, thermal flow sensors 5 and 6, as described above, may be preferably built into the first and second flow paths 2 and 3, described above, in the gas meter having this type of flow path structure. In particular, as described below, the thermal flow sensor 5 that is built into the first flow path 2 is used as the sensor for the flow rate measurement, and the thermal flow sensor 6 that is built into the second flow path 3 is used as a sensor for detecting a leak, as described below.

Note that the first, second, and third flow paths 2, 3, and 4 are formed as spaces (flow paths) having different flow path cross-sectional areas through partitioning by partitioning walls that extend in the direction of the flow path in the space within ducting that forms, for example, the main flow path 1. The respective flow path resistances R1, R2, and R3 of this type of first, second, and third flow paths 2, 3, and 4 vary differently depending on the flow rate (flow velocity) V of the gas to be measured that is flowing in the ducting (the main flow path 1) and depending on differences in the flow path cross-sectional areas, differences in the speed distribution of the laminar flow in the inner portion of the ducting, and depending on changes in the flow velocity gradients due to the wall surfaces of the partitioning walls, and the like.

Specifically, when the flow rate (flow velocity) V of the gas to be measured, which flows through the ducting (main flow path 1), is small, the flow path resistances R1 and R2 of the first and second flow paths 2 and 3, having a large flow path cross-sectional areas, will be smaller than the flow path resistance R3 of the third flow path 4 that is formed by a group of minute flow paths that have small flow path cross-sectional areas. Consequently, the gas to be measured, at a minute flow rate, flows exclusively into the first and second flow paths 2 and 3. However, when the aforementioned flow rate (flow velocity) V increases, the speed gradient that is the result of contact resistance between the gas to be measured and the wall surfaces of the partitioning walls and the ducting increases in accordance therewith, and thus the gas to be measured flows into the third flow path 4, overcoming the flow path resistance R3 of the third flow path 4 that is formed by the plurality of minute flow paths that each has a small flow path cross-sectional area. That is, the respective flow path resistances R1, R2, and R3 of the first through third flow paths 2, 3, and 4 will vary passively in accordance with the flow rate. The result is that it becomes more difficult for the gas to be measured to flow into the first and second flow paths 2 and 3, relative to the third flow path 4, with an increase in the flow rate (flow velocity) V of the gas to be measured that is flowing in the ducting (the main flow path 1), causing a change in the partial flow rates relative to the third flow path 4.

Consequently, the provision of the respective flow rate sensors 5 and 6 in the first and second flow paths 2 and 3 enables the reliable detection of minute flow rates by the respective flow rate sensors 5 and 6 because, when the flow rate (flow velocity) V of the gas to be measured, which is flowing in the main flow path 1, is extremely small, then that flow rate is merely divided into flows according to the flow path cross-sectional areas of the first and second flow paths 2 and 3 and third flow path 4. Furthermore, when the flow rate (flow velocity) V of the gas to be measured, which is flowing in the main flow path 1, is increased, then there is a change in the partial flow rates of the first and second flow paths 2 and 3, relative to that of the third flow path 4, in accordance with the increases in each of the flow path resistances R1 and R2 of the first and second flow paths 2 and 3, preventing an increase in the flow rate of the gas to be measured that passes through the first and second flow paths 2 and 3, which prevents each of the flow rate sensors 5 and 6 from becoming saturated, enabling reliable detection of the flow rate.

At this time, a high flow rate sensor capable of detecting large flow rates with high accuracy may be used as the flow rate sensor 5 provided in the first flow path 2, and a low flow rate sensor capable of detecting minute flow rates with high accuracy is used as the flow sensor 6 that may be provided in the second flow path 3, thus enabling a measurement across a broad range from minute flow rates to large flow rates, through the parallel use of these flow rate sensors 5 and 6. Note that a narrow width portion (a nozzle portion), wherein the pipe diameter (the flow path cross-sectional area) is constricted, is preferably provided in the middle of the second flow path 3, enabling the gas that is to be measured, which has entered into the second flow path 3, to flow while being compressed within the second flow path 3, and to pass through the narrow width portion in a state wherein the flow velocity has been increased. The result is that the apparent flow rate (flow velocity) of the gas to be measured that is flowing in the second flow path 3 can be increased at the narrow width portion (the nozzle portion). Consequently, the provision of the flow rate sensor 6 at the narrow width portion (the nozzle portion) in the second flow path 3 of the flow path structure set forth above makes it possible to perform the detection with high sensitivity, even when there is only a minute leakage flow.

Additionally, this type of flow path structure enables the provision of the flow rate sensors 5 and 6 to be aligned together in a position in the direction of the flow path, without providing different flow rate regions along the lengthwise direction of the flow path, as with the conventional technology. Because of this, the flow path lengths that are required for each of the measured flow rate regions are different in the conventional technology, requiring the large flow rate region and the small flow rate region to be disposed relatively in the lengthwise direction. However, in the invention in the present application, the positions, in the direction of the flow path, of each of the flow rate sensors may be, for example, lined up with each other when providing different flow rate regions, making it possible to achieve a flow path length that is as short as that required for a single flow rate region. For this reason, miniaturization of the gas meter is easy when compared with the prior technology, without the tendency for the flow paths to be long.

The gas meter as set forth in the present invention is able to perform uniform detections, ranging from minute flow rates to large flow rates, using the flow rate sensors 5 and 6 by combinations of the respective flow rate sensors 5 and 6 in the first and second flow paths 2 and 3, wherein the partial flow rate is high when there is a minute flow rate and the partial flow ratio is low when there is a large flow rate, of the first, second, and third flow paths 2, 3, and 4 wherein, fundamentally, the part flow ratios vary passively when there is a minute flow rate flowing versus when there is a large flow rate flowing. In particular, a narrow width portion (nozzle portion) for increasing the flow velocity may be provided in the second flow path 3, enabling the detection of minute leakage flow rates with high sensitivity through the provision of the flow rate sensor 6 in this narrow width portion (nozzle portion).

Specifically, directing essentially all of the minute flow rate to the first and second flow paths 2 and 3 wherein the flow rate sensors 5 and 6 are provided essentially increases the flow velocity (the apparent flow velocity), making it possible to detect the minute flow rate reliably. On the other hand, for a large flow rate, the maximum flow velocity is controlled by controlling the flow rates that are directed into the first and second flow paths 2 and 3 wherein the flow rate sensors 5 and 6 are provided, thereby enabling flow rate detection without saturating the flow rate sensors 5 and 6. Consequently, the gas meter as set forth in the present invention is capable of measuring integrally, using the flow rate sensors 5 and 6, for example, from a minute flow rate of about 5 l/h due to a gas leak caused by, for example, a crack in a pipe, through a large flow rate of a maximum of about 30,000 l/h, which is the normal state of use. In particular, the provision of the flow rate sensor 5 for the large flow rate, capable of detecting with high accuracy the flow rate in the normal state of use of gas, in the first flow path 2 enables the measurement of the gas flow rate without problems, in practice, through enabling compensation for the roughness of the detection accuracy of the flow rate sensor 6 at the time of a large flow rate.

Furthermore, rather than providing the large flow rate region and the small flow rate regions individually along the lengthwise direction, as has been done conventionally, the flow rate sensors 5 and 6 are provided in the same peripheral direction on the peripheral surface of the flow path, where the large flow rate region and the small flow rate region are both formed with the same predetermined flow path length. As a result, it is possible to share the same flow path length that is required for forming both the large flow rate measuring region and the small flow rate measuring region. This makes it possible to have a structure that enables miniaturization of the gas meter.

In the gas meter that is basically structured as set forth above, a distinctive characteristic of the present invention is that,; the first and second flow paths 2 and 3 into which the flow rate sensors 5 and 6 are built, are structured by partitioning the main flow path 1 along the flow path direction thereof, as set forth above, and the contaminant-removing filter 7 for preventing the incursion of contaminants into the flow rate measuring paths by capturing the contaminants that are mixed into the gas to be measured, may be provided on only one end or both ends of the first flow path 2 that is used for the flow rate measurement. That is to say, the contaminant-removing filter 7 is preferably provided in only the first flow path 2, and no contaminant-removing filter 7 is provided in the second flow path 3 that is used for detecting the leak flow rate, nor the third flow path 4 that is the main flow path for the gas to be measured that is flowing in the main flow path 1, with the distinctive feature that the increase in the pressure loss due to the contaminant-removing filter 7 is kept to the minimum.

Additionally, the contaminant-removing filter 7 assures the measurement accuracy through preventing a deterioration in performance of the flow rate sensor 4 that is provided in the first flow path 2, by preventing the incursion of the contaminants (dust) into the first flow path 2, while, on the other hand, for the second and third flow paths 3 and 4, the gas to be measured flows as is, without being affected by the contaminant-removing filter 7, and thus there is a distinctive feature of being able to detect reliably gas leaks at minute rates, and the distinctive feature of the gas to be measured flowing without leading to the problems of pressure loss.

Incidentally, because no contaminant-removing filter 7 is provided in the second flow path 3, there is the risk that contaminants (dust) may enter into into the second flow path 3, and adhere to the surface of the flow rate sensor 6, causing some degree of deterioration of the detection accuracy in the flow rate sensor 6 thereby. However, because the flow, into the second flow path 3, of the gas to be measured, itself, it is no longer prevented by the contaminant-removing filter 7, it becomes possible to detect reliably gas leaks at minute flow rates. Furthermore, the gas leak detection need only detect whether or not there is a flow of minute quantities of gas, while, conversely, there is no need to detect the magnitude of the gas flow, so the deterioration of the detection accuracy due to the adhesion of contaminants (dust) on the surface of the gas rate sensor 6 is essentially no problem. Consequently, in this point as well it is preferable to not provide a contaminant-removing filter 7 for the second flow path 3, so as to an enable the gas at minute flow rates to enter therein reliably.

Because no contaminant-removing filter 7 is provided for the third flow path 4 either, where this third flow path 4 occupies nearly all of the flow path cross-sectional area of the main flow path 1, the gas to be measured that flows through the main flow path 1 flows through the third flow path 4 without being affected by any pressure loss due to the contaminant-removing filter 7. Consequently, even if the pressure loss that is tolerable in a low-pressure gas meter wherein the supply pressure for the gas to be measured is about 2 kPa is no more than about 200 Pa at most, it becomes possible for the gas to that is be measured to flow with stability within the tolerable pressure loss range. For this reason, the structure set forth above enables the reliable detection of minute gas leaks of about 5 l/h along with having measurement accuracy that is adequately high in a low-pressure gas meter wherein the gas to be measured flows at a high flow rate of, for example, about 30,000 l/h.

Figure 5:
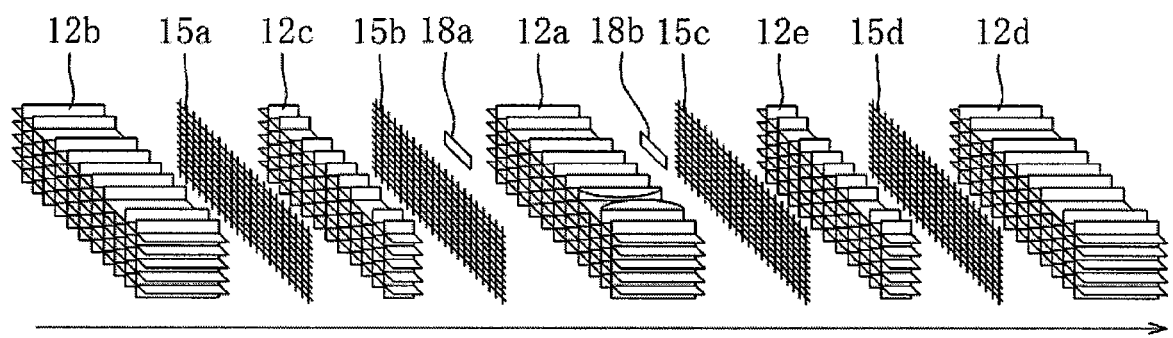
FIG. 5 is an exploded diagram illustrating schematically the structure of a gas meter according to a first example of embodiment according to the present invention, disassembled in the direction of flow of the fluid.
Figure 6:
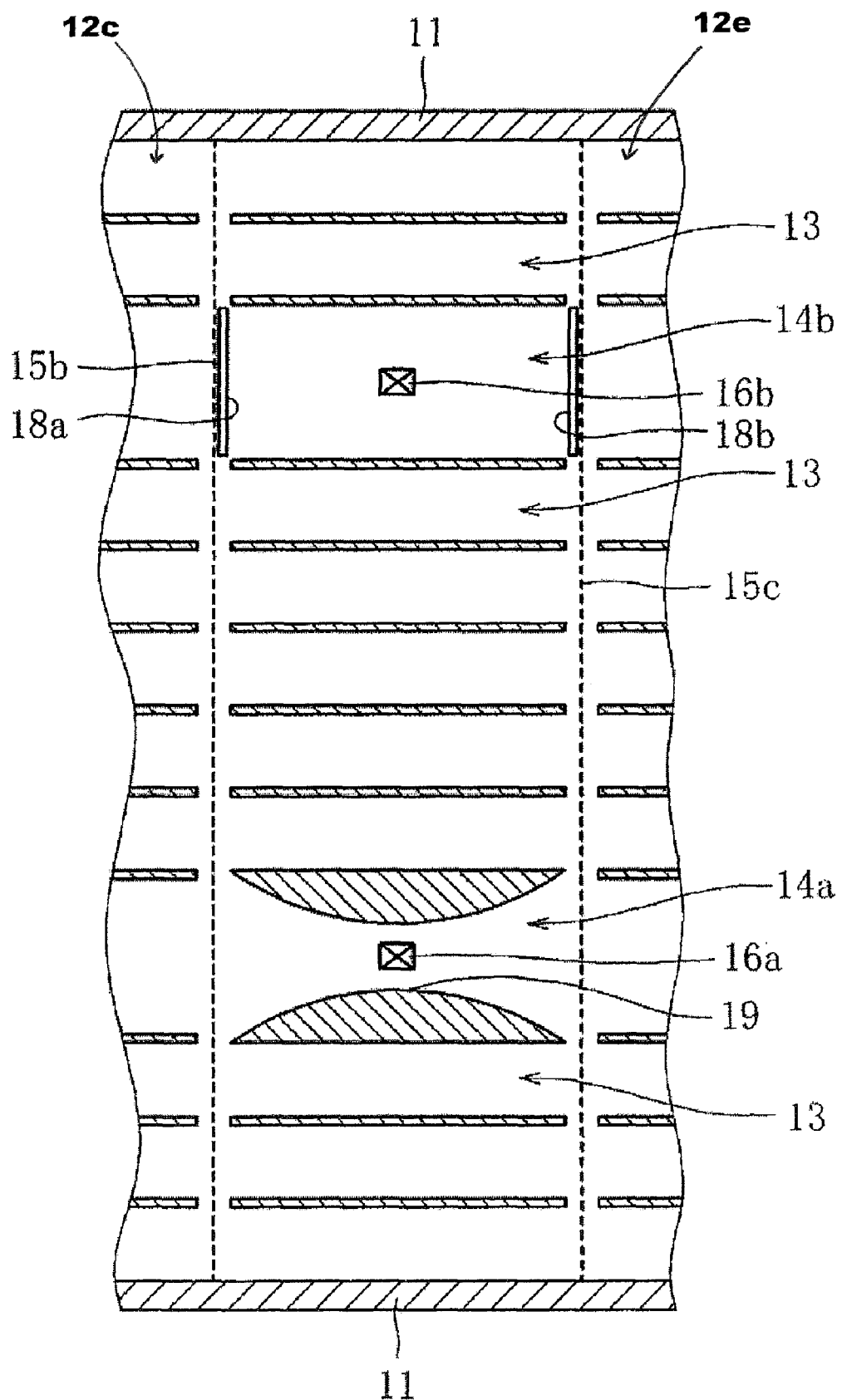
FIG. 6 illustrates schematically a cross-sectional structure of critical components in the flow paths in the gas meter illustrated in FIG. 5.

FIG. 5 is an exploded diagram illustrating schematically the flow path structure of a gas meter as set forth in a first embodiment of the present invention, structured as set forth above, disassembled in the direction of flow of the fluid, and FIG. 6 is a diagram illustrating schematically a cross-sectional diagram of the critical components thereof.

This gas meter is structured with, as the main unit thereof, a lattice unit 12 that is provided by partitioning, into a plurality of minute flow paths in the direction of the cross-sectional surface, the interior space within ducting 11 (the primary flow path 1) that has a flow path cross-sectional shape that is square. This lattice unit 12 is structured from combining, into the shape of a lattice, a plurality of flat partitioning walls that are provided in parallel along the direction of flow of the fluid of the ducting 11. The lattice unit 12 that is used, in particular, in the present example of embodiment comprises a sensor lattice unit 12a wherein, for example, a flow rate sensor is built in as described below, first and second lattice units 12b and 12*c* that are provided on the upstream side of the sensor lattice unit 12*a*, and first and second lattice units 12*d* and 12*e* that are provided on the downstream side of the sensor lattice unit 12*a*.

Note that these lattice units 12 (12*a* and 12*b* through 12*e*) not only form a plurality of minute flow paths 13 (a large number thereof), which have, for example, in essentially square flow path cross-sectional shapes, into an array in the shape of a matrix, but also form two minute flow paths 14 that are formed so as to have essentially rectangular flow path cross-sectional shapes, with flow path cross-sectional surface areas essentially twice those of the aforementioned minute flow paths 13. These two minute flow paths 14 are at, for example, the edge portion of the lattice unit 12, and may be formed by partially removing the flat partitioning walls that partition two adjacent minute flow paths 13. Furthermore, these lattice units 12 (12*a* and 12*b* through 12*e*) form a plurality of flow paths that are connected in the direction of flow of the fluid through stacking together each of the lattice units 12 (12*a* and 12*b* through 12*e*), as illustrated in FIG. 5, in the direction of flow of the fluid, with mesh units (wire meshes) 15 (15*a*, 15*b*, 15*c*, and 15*d*), respectively, interposed therebetween. Note that each of these mesh units (wire meshes) 15 nearly exclusively bear the role of flow baffling filters for baffling the flow of the fluid that flows through the lattice unit 12.

Note that each of the aforementioned plurality of minute flow paths 13 (a large number thereof) that is formed by the lattice units 12 (12*a* and 12*b* through 12*e*) individually has a flow path cross-sectional area that is smaller than that of the minute flow path 14, described above, at one half the size; however, when these are taken as a group, they can be seen, as a whole, as forming a flow path (the third flow path 4) that has a large total flow path cross-sectional area, through which nearly all of the gas to be measured flows. Additionally, the two minute flow paths 14 (14*a* and 14*b*) have the flow rate sensors 16 (16*a* and 16*b*) build therein, and are used as the aforementioned first and second flow paths 2 and 3.

Note that the flow path cross-sectional area of each of the minute flow paths 13, which is in the shape of a square, is preferably set to be about 2.5%, for example, of the flow path cross-sectional area of the ducting 11 (main flow path 1), and the flow path cross-sectional area of each of the minute flow paths 14, which is in the shape of a rectangle, is preferably set to be, for example, about 5.0% of the flow path cross-sectional area of the ducting 11 (main flow path 1). Additionally, the cross-sectional area of the third flow path 4, which is formed by combining the plurality of minute flow paths 13, preferably occupies approximately 90% of the flow path cross-sectional area of the ducting 11 (the main flow path 1), and carries nearly all of the gas to be in measured that flows in the ducting 11 (the primary flow path 1). In other words, this is set so that each of the individual minute flow paths 14*a* and 14*b* carries approximately 5% of the gas to be measured that flows through the ducting 11 (the primary flow path 1).

In particular, one of the two minute flow paths 14 that are formed in the sensor lattice unit 12*a* is provided with a nozzle 19 at essentially the middle position of the flow path, as illustrated in FIG. 6, to partially constrict the flow path cross-sectional area. The minute flow path 14*a* wherein this nozzle 19 is provided is used as the second flow path 3, set forth above, for detecting a gas leak, and the low flow rate sensor 16 is at the position of the constriction of the flow path cross-sectional area by the nozzle 19. The other minute flow path 14*b*, wherein the nozzle 19 is not provided, is used as the first flow path 2, set forth above, for detecting the large flow rate (for flow rate measurement), and a high flow rate sensor 16*b* is positioned in essentially the center thereof. Note that the two minute flow paths 14*a* and 14*b* are seen as flow paths that are cut out from the third flow path that is formed by combining together the aforementioned minute flow paths 13, and can also be taken as the flow path, set forth above, wherein the part flow ratio changes in response to the flow rate.

Additionally, on both ends of the minute flow path 14*b* that is used for the flow rate measurement, dust filters 18*a* and 18*b* (contaminant-removing filters 7) are provided in order to prevent the incursion of contaminants into the minute flow path 14*b*. These dust filters 18*a* and 18*b* may preferably be so-called fine mesh units, and when, for example, the mesh units (wire meshes) 15 (15*a*, 15*b*, 15*c*, and 15*d*) for flow baffling are of about gauge 50 mesh, the dust filters 18*a* and 18*b* are made from mesh units (wire meshes) of about mesh gage 100 that has the effect of removing contaminants (dust) that are mixed into the gas to be measured. That is, when one considers the size of the contaminants (dust particles) that are the contaminants that cause damage to the high flow rate sensor 16*b* that is built into the minute flow path 14*b* (the first flow path 2), where this contaminant (dust) is included in the gas to be measured, rough wire meshes of a mesh gage of about 100, or folded steel meshes, or a mesh units that use polyethylene or polypropylene, or the like, may be included as the dust filters 18*a* and 18*b*. Note that HEPA filters, or the like, which have an even greater dust collecting effects, can, of course alternatively be used as the dust filters 18*a* and 18*b*.

Note that inevitably, with the provision of the dust filters 18*a* and 18*b*, and with finer meshes, the greater the pressure loss due to the dust filters 18*a* and 18*b*. Consequently, it is necessary, of course, to set the mesh of the filters 18*a* and 18*b* so as to be rough in a range that can enable detection sensitivity to be achieved, in consideration of the minimum flow rate detection required in the high flow rate sensors 16*b* that is built into the minute flow path 14*b*. However, even if there is some degree of pressure loss due to the dust filters 18*a* and 18*b*, the flow rate of the gas, itself, to be measured, which flows through the minute flow path 14*b* (the first flow path 2) may be kept to about 5% overall, given the ratio of the flow path cross-sectional areas, set forth above, so, as a whole, the pressure loss described above is not a problem.

Note that when mesh-shaped objects are used as the dust filters 18*a* and 18*b*, one can expect a flow baffling effect relative to the gas to be measured, due to the dust filters 18*a* and 18*b*, and thus it is possible to eliminate the use of the mesh unit (wire mesh) for flow baffling, described above, for the portions wherein the dust filters 18*a* and 18*b* are provided.

Conversely, it is not necessary to provide the dust filters 18*a* and 18*b*, described above, on the minute flow path 14*a* for detecting the minute flow rate (the leakage flow rate), but, conversely, preferably the dust filters 18*a* and 18*b* are not provided, as described above. That is, the flow rate sensor 16*a* that is built into the minute flow path 14*a* for detecting the minute flow rate (the leakage flow rate) can fulfill its purpose insofar as the passage of the gas to be measured can be detected, and it is not necessary to measure the flow rate itself with accuracy, and thus there is no danger of having a major problem due to the adhesion of contaminants, as described above. Consequently, there is no need to detect the gas flow rate accurately, and from the perspective of detecting reliably the leakage flow rate, it is better if the dust filters 18*a* and 18*b* are not provided on the minute flow path 14*a*, set forth above.

The gas meter having the flow path structure, wherein a lattice unit 12 is used to partition the flow path, as set forth above, has a cross-sectional area for each of the plurality of the minute flow paths 13 that form the third flow path 4 that is smaller than that of each of the two minute flow paths 14 wherein the flow rate sensors 16a and 16b are equipped, so the flow path resistance is higher, so that when the gas to be measured, which is flowing through the ducting 11, has a minute flow rate, then most of the gas to be measured flows into the two minute flow, paths 14 wherein the flow path resistances are small. Additionally, as the flow rate of the gas to be measured, flowing through the ducting 11, grows larger, the flow path at resistances of the minute flow paths 13, described above, are overcome, so that the gas to be measured flows into the minute flow paths 13 as well.

The result is that the part flow ratio of the gas flow rate that flows into the minute flow paths 13 and the gas flow rate that flows into the minute flow paths 14a and 14b will vary in accordance with the increase in the gas flow rate. Additionally, the flow rate of the gas to be measured that flows through the minute flow paths 14a and 14b, wherein the flow rate sensors 16a and 16b are provided, is gradually suppressed as the flow rate is increased. This makes it possible to increase the detection sensitivity for the minute flow rates for the flow rate sensors 16a and 16b that are disposed, respectively, in the minute flow paths 14a and 14b, and possible to suppress the flow rate that branches and flows into the minute flow paths 14a and 14b when there is a large flow rate, and thus makes it possible to perform flow rate detection while preventing the saturation of the flow rate sensors 16a and 16b.

In the gas meter having the flow path structure set forth above, a nozzle portion 19 with a restricted flow path cross-sectional area is preferably provided at essentially the middle of one of the minute flow paths 14 wherein the low flow rate sensor 16a is built, as described above. The first and second front lattice units 12b and 12c that are positioned on the upstream side of the sensor lattice unit 12 wherein the nozzle portion 19 is provided form a supplemental interval for the gas that is to be measured that flows into the minute flow path 14a, where all of the gas to be measured that flows into this supplemental interval is supplied to this nozzle portion 19. The result is that the gas to be measured that has flowed into the minute flow paths 14 is subjected to an increase in the flow velocity by the constriction of the flow path cross-sectional area due to the nozzle portion 19, and thus the low flow rate sensor 16a that is provided at the nozzle portion 19 of the minute flow path 14a is able to detect the minute flow rate with higher accuracy. In particular, the aforementioned low flow rate sensor 16a is able to detect the minute flow rate with higher sensitivity than the high flow rate sensor 16b that is provided in the other minute flow path 14b wherein the nozzle portion 19 is not formed.

Additionally, the dust filters 18a and 18b (contaminant-removing filters 7), described above, are preferably provided at both ends of the other minute flow path 14b wherein the high flow rate sensor 16b is provided, to prevent the incursion of contaminants (dust) into the minute flow path 14b. Consequently, it is possible to prevent effectively the adhesion of contaminants (dust and dirt) onto the high flow rate sensor 16b, making it possible to measure the flow rate with high accuracy by maintaining the stability of the flow rate measurement reliability in the high flow rate sensor 16b.

In particular, in the gas meter with the flow path structure set forth above, the total flow path cross-sectional area of the third flow path 4 (the group of the plurality of minute flow paths 13) is greater than the total flow path cross-sectional area of the first and second flow paths 2 and 3 (the minute flow paths 14a and 14b), so nearly all of the gas to be measured flows through the third flow path 4, and at most about several percent of the gas to be measured flows through the first flow path 2 (the minute flow path 14b). Consequently, even when a contaminant-removing filter 7 (the dust filters 18a and 18b) is provided, as described above, its presence essentially does not lead to an increase in the pressure loss. Stated conversely, it is possible to protect the flow rate sensor 16b from contaminants (dust) through the provision of the dust filters 18a and 18b without leading to problems with pressure loss. Consequently, if, for example, the supply pressure for the gas to be measured is at about 2 kPa, then even in a low-pressure gas meter wherein the tolerable pressure loss is a maximum of about 200 Pa, it is still possible to provide effective protection to the flow rate sensor easily using the dust filters 18a and 18b.

Figure 7:
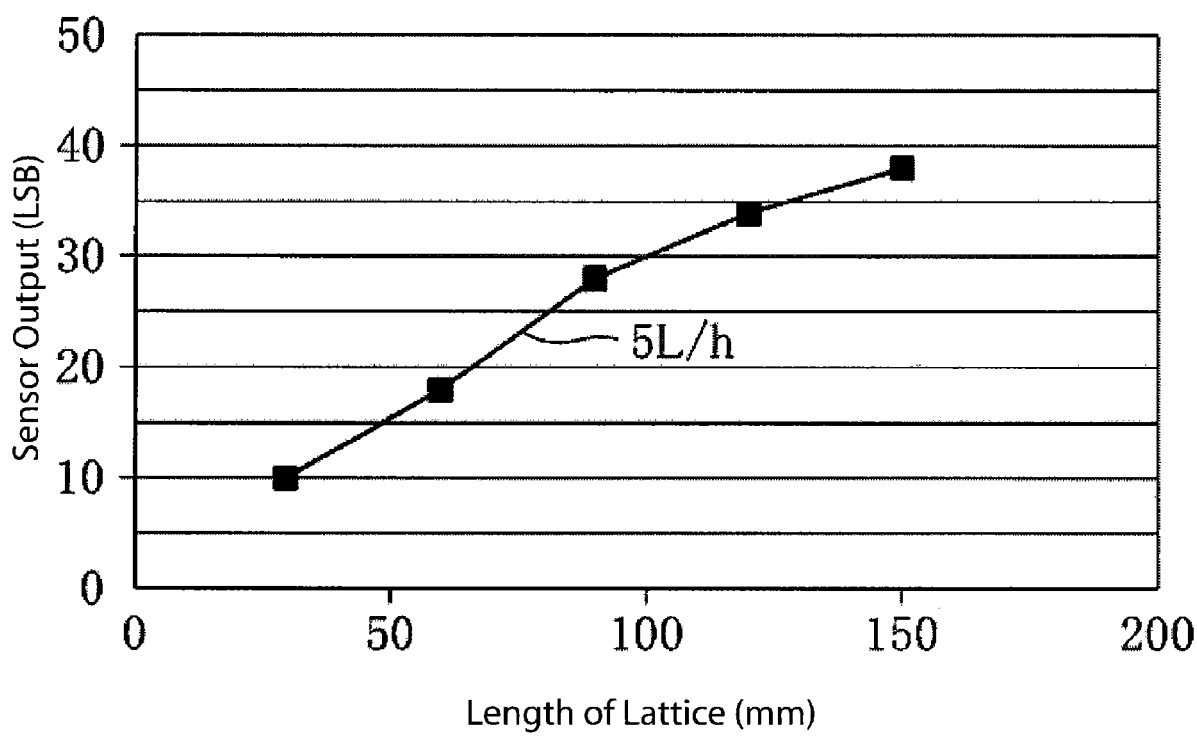
FIG. 7 illustrates a sensor output characteristic that varies with differences in the length of lattice units of the gas meter illustrated in FIG. 5.

Note that FIG. 7 illustrates the sensor output characteristics that vary with changes in the length of the lattice units 12 (the flow path length). It has been determined from experimental data that the longer the length of the lattice units 12, the less likely there is to be an impact from the pressure loss of the nozzle portion 19, and the greater the sensor output that can be obtained. This phenomenon is thought to be due to there not being any large changes in the flow rate of flow into the minute flow paths 14, in comparison with the changes of the flow rate of flow through the main flow path, due to the compression of the fluid (the gas) the longer the length of the flow paths of the minute flow paths 13 and 14 that are partitioned by the lattice unit 12, and, in particular, the longer the length of the supplemental interval on the upstream side of the nozzle portion 19. Consequently, it can be said that it is extremely preferable to secure a supplemental interval in the minute flow path 14a, and having the length of the lattice element 12a, for stabilizing the flow path resistance, be long enables a change in the part flow ratio between the minute flow paths 13 and 14 in accordance with the flow rate (flow velocity) of the fluid that flows through the ducting 11, regardless of the existence of the nozzle portion 19, and thus enables highly sensitive detection of minute flow rates.

Figure 8:
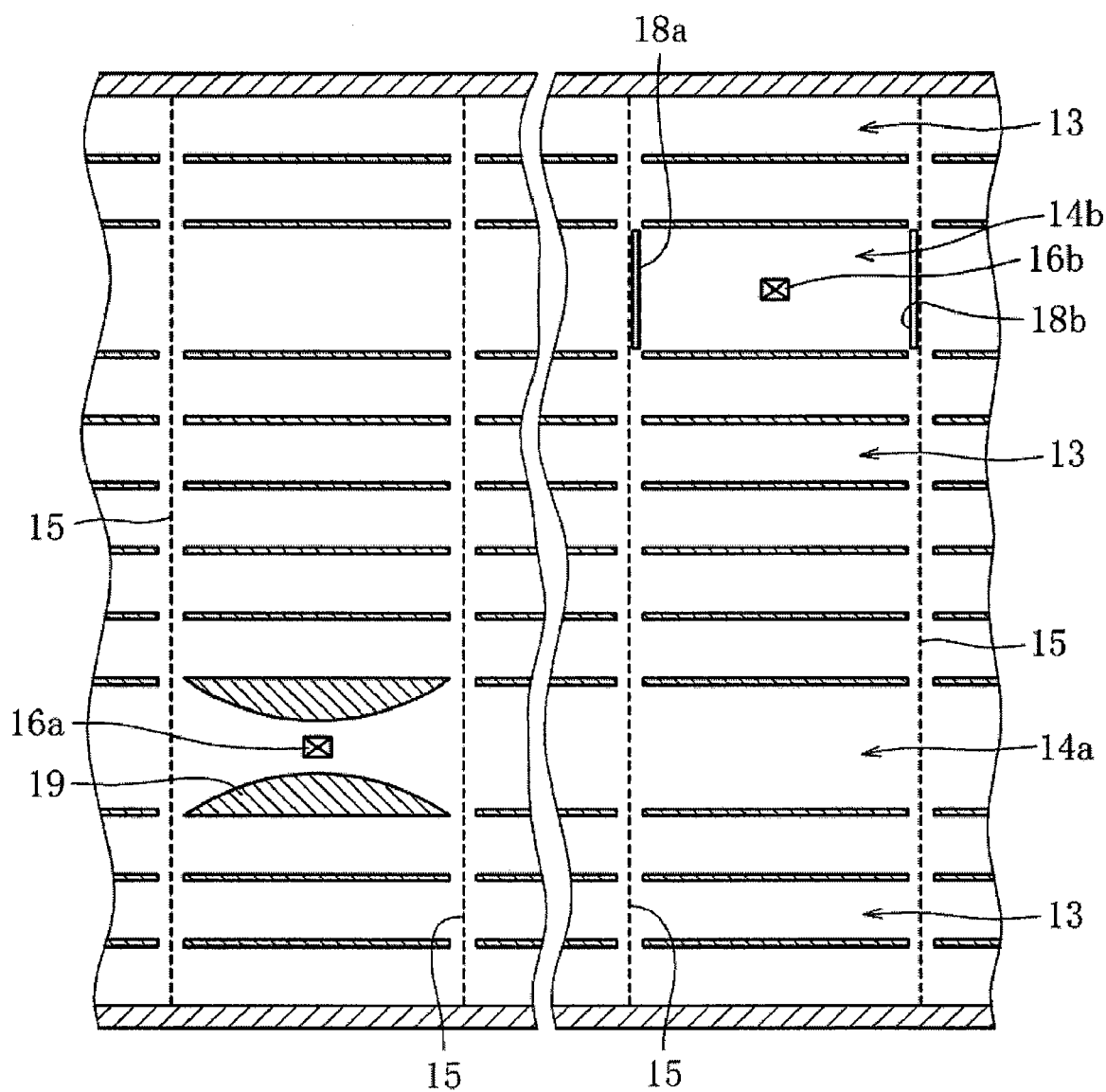
FIG. 8 illustrates schematically cross-sectional structures of the critical components in a gas meter as set forth in a second embodiment according to the present invention.

Note that the present invention is not limited to the form of embodiment set forth above. For example, it is not necessarily a requirement that the flow rate sensor 16a for detecting the leakage flow rate and the flow rate sensor 16b for the flow rate measurement be disposed in parallel, where, as illustrated in FIG. 8, it is possible to provide each in a different position in the direction of flow. Additionally, the ratio of the flow path cross-sectional areas of the first and second flow paths 2 and 3 to that of the third flow path 4 may be set in accordance with measurement specifications, and the like, and may be set in accordance with, for example, different viscosities depending on the type of fluid. In the present form of embodiment, a flow path structure that is symmetrical in the direction of flow of the fluid is used, wherein lattice units are provided on both the upstream side and the downstream side of the sensor lattice unit 12a. This type of symmetrical flow path structure has taken into consideration the possibility of a complete reversal in the direction of flow of the fluid; however, when the direction of flow of the fluid is determined uniquely, then the lattice units 12b and 12c need only be provided on the upstream side of the sensor lattice unit 12a. Additionally, the length of the flow path that is formed by the lattice unit 12 may also be determined in accordance with the specification.

As for the mesh units 7, 15, honeycomb-structure units, punched metal, or the like, may be used instead of only wire mesh. Furthermore, the lattice unit 12 set forth above may have a flow path cross-sectional shape that is a so-called honeycomb-shaped hexagonal shape, or a flow path cross-sectional shape that is a triangular shape, instead of the square flow path cross-sectional shape.

Those skilled in the art will readily recognize additional numerous adaptations and modifications which can be made to the present invention which fall within the scope of the invention as defined in the claims. Moreover, it is intended that the scope of the present invention include all foreseeable equivalents to the structures as described with reference to FIGS. 1-8. Accordingly, the invention is to be limited only by the scope of the claims and their equivalents.

The invention claimed is:

1. A gas meter comprising:
a main flow path leading to a first flow path, a second flow path, and a third flow path which are provided in parallel by partitioning, along a direction of gas flow, a cross section of the main flow path through which the gas to be measured flows, the third flow path comprises a plurality of minute flow paths that are provided in parallel with flow path cross-sectional areas smaller than those of the first and second flow paths, wherein partial flows of the gas to be measured are generated on the first, second and third flow paths depend on the gas flow rate, the first and second flow paths having larger partial flow rates than the third flow path when the flow rate of the gas to be measured which flows in the main flow path is small, and the partial flow rates in the minute flow paths are increasing relative to the partial flow rates of the first and second flow paths when the flow rate of the gas to be measured, which flows through the main flow path, increases;
a first flow rate sensor for measuring the flow rate, provided in the first flow path;
second a flow rate sensor for measuring a leakage flow rate provided in the second flow path;
a filter for flow baffling, provided in either one end or both ends of the first and second flow paths; and
a contaminant-removing filter, provided at one end or both ends of the first flow path.

2. The gas meter as set forth in claim 1, wherein the second flow path is provided with a narrow width portion wherein the flow path cross-sectional area is constricted, after a supplemental interval for the flow of the gas to be measured has been obtained, and wherein a flow path structure having the second flow rate sensor is provided in this constricted width portion.

3. The gas meter as set forth in claim 1, wherein the first and second flow paths and the plurality of minute flow paths that form the third flow path are formed by partitioning the flow path cross section of the main flow path through a plurality of partitioning walls that are provided along the direction of flow of the main flow path.

4. The gas meter as set forth in claim 1, wherein the first, second and third flow paths include a plurality of the lattice units positioned along the gas flow direction in the main flow path, and the flow baffling filter comprises one or more mesh units each interposed between adjacent ones of the plurality of lattice units.

5. The gas meter as set forth in claim 4, wherein the contaminant-removing filter comprises one or more mesh units provided at one or both ends of one of the plurality of lattice units.

* * * * *